United States Patent [19]
Van Santbrink et al.

[11] Patent Number: 6,014,088
[45] Date of Patent: Jan. 11, 2000

[54] METHOD AND SYSTEM FOR CONTACTLESS EXCHANGE OF DATA BETWEEN A READ/WRITE UNIT AND ONE OR MORE INFORMATION CARRIERS

[75] Inventors: Ronald Barend Van Santbrink, Nieuwe Muidervaart 9, NL-1398 PP Muiden; Dirk Langedijk, Eindhoven; Jan Peter Exalto, Zetten, all of Netherlands

[73] Assignee: Ronald Barend Van Santbrink, Muiden, Netherlands

[21] Appl. No.: 08/758,370

[22] Filed: Nov. 29, 1996

[30] Foreign Application Priority Data

Nov. 28, 1995 [NL] Netherlands ............ 1001761

[51] Int. Cl.⁷ ................................. H04Q 1/48
[52] U.S. Cl. ................................. 340/825.54
[58] Field of Search ........ 340/825.34, 825.54, 340/572, 572.1, 572.4; 342/42, 44; 375/342

[56] References Cited

U.S. PATENT DOCUMENTS

| | | | |
|---|---|---|---|
| 5,218,343 | 6/1993 | Stobbe | 340/572 |
| 5,266,926 | 11/1993 | Beigel | 340/572 |
| 5,313,198 | 5/1994 | Hirano | 340/825.54 |
| 5,347,263 | 9/1994 | Carroll et al. . | |
| 5,376,932 | 12/1994 | Samokine et al. | 340/825.54 |
| 5,533,067 | 7/1996 | Jamal | 375/341 |
| 5,548,291 | 8/1996 | Meier | 342/51 |

FOREIGN PATENT DOCUMENTS

| | | |
|---|---|---|
| 0 461 878 | 12/1991 | European Pat. Off. . |
| 0 473 569 | 3/1992 | European Pat. Off. . |
| 37 17 109 | 12/1987 | Germany . |

*Primary Examiner*—Edwin C. Holloway, III
*Attorney, Agent, or Firm*—Young & Thompson

[57] ABSTRACT

A method and system for contactless exchange of information between a read/write unit and at least one information carrier, using wireless radiofrequency signal transmission including an input/output circuit and associated coil device and the information carrier including another input/output circuit and associated coil device, and each further including a processing circuit. The read/write unit transmits radiofrequency signals divided in time slots, each successively including a sync pulse and a single data bit. The radiofrequency signal is suppressed in each time slot for a period differing in length for the one and the zero data bit. The data bit signal, received in the read/write unit solely during transmission of the radiofrequency signal, is sampled, after rectification, for detection of the data bits of the information carrier. The read/write units is provided with a detector having two sample and hold circuits in parallel, to which the input signal after rectification is applied in parallel and to which sampling pulses are applied by the processing circuit for sampling successively in time of the signal.

3 Claims, 8 Drawing Sheets fig-4 fig-5a fig-5b fig-6 fig-7 fig-8 a.

METHOD AND SYSTEM FOR CONTACTLESS EXCHANGE OF DATA BETWEEN A READ/WRITE UNIT AND ONE OR MORE INFORMATION CARRIERS

BACKGROUND OF THE INVENTION

The invention relates to a method and system for contactless exchange of information between a read/write unit and at least one information carrier, using wireless radiofrequency signal transmission, for reading and writing respectively of data in the information carrier(s), said unit comprising an input/output circuit and associated coil means and the information carrier comprising another input/output circuit and associated coil means, and each further comprising a processing circuit, both coil means being inductively coupled to each other for bidirectional data transmission when the information carrier is positioned within range, whereby the coil means in the information carrier, solely during transmission of the radiofrequency signal by the read/write unit, are detuned or not for said data transmission. Such a method and system are known from EP-A-0461878.

These systems, known from said publication and in practice, are used for many purposes. In the following said read/write unit will be denoted with the designation "reader". Furthermore, in this description, when a chip card is mentioned as an example of an information carrier it should be clear that herewith also a chip pen or such element is meant. With such a reader and associated information carrier many kernel functions can be implemented, such as

- establishing whether card and reader are authentic;
- establishing the identity of the card holder, which can be both a human being and an object or good;
- granting of authorization or key function to the card holder, both physical authorization (e.g. access to a building or space), and logic authorization (e.g. access to a service or data file);
- supporting a transaction, e.g. for a payment, supply of a service or for a telephone call;
- storage of data, e.g. data of the card holder and of management data required for a good working of the application.

During said contactless exchange of information, data is transmitted via radiofrequency transmission. The information carrier therefore is provided with a circuit which has its own power supply, or with a circuit which derives its energy from the radiofrequency electromagnetic field, supplied by the reader, whereby in the last case the associated memory may have its separate power supply.

Said contactless information carriers will fulfil in the future a key role in several industrial and commercial processes in which large numbers of persons and/or goods have to pass. This is for example the case for public transport, distribution centers and on toll high ways. The access in all these processes, the validation and control by means of contactless cards is faster and for the system in its whole cheaper in exploitation.

The systems known in practice therefore are provided in general both in the reader and in the information carrier with an input/output circuit which for the emission and for receipt of data signals has separate coil means. In practice, these systems have a relative large sensitivity for interference specifically in surroundings having moving or static (metal) objects and with dirt and dust. Moreover, the implementation in the information carrier with separate coil means for transmitting and for receiving its rather cumbrous.

Even in the system known from above mentioned European application, in which the information carrier uses a single coil means both for transmitting and receiving, the sensitivity for interference is rather high. Furthermore, in this known system, for data transport in both directions, the ones and zeros are distinguished by the number of high- and low-interchanges in a timeslot, i.e. in the period between two synchronization pulses. These interchanges are determined by a comparator being fixedly adjusted, through which the operational range is limited and the sensitivity for interference in the limit region is quite high.

OBJECTS OF THE INVENTION

It is an object of the invention to avoid above mentioned problems and to provide a method and a system for contactless exchange of information, wherein the reliability of the data transmission, in the presence of interference of all types, is high both when using proximity cards and when using hands free cards.

It is also an object of the invention to provide such a system wherein the information carrier meets the standard ISO norms while still maintaining high reliability.

SUMMARY OF THE INVENTION

According to the invention this aim is obtained with a method of the type mentioned in the background of the invention such that the read/write unit is implemented, for serial data transmission, to transmit radiofrequency signals divided in time slots, which each successively include a sync pulse and a single data bit, the radiofrequency signal being suppressed in each time slot for a period differing in length for the one and other single data bit, and that the input/output circuit of the read/write unit is implemented such that the data bit signal, received solely during transmission of the radiofrequency signal, is sampled, after rectification, for detection of the data bits of the information carrier.

this aim is also obtained with a system of the type mentioned in the background section such that the processing circuit of the read/write unit is implemented for providing a data signal divided in time slots, which each comprise a sync pulse and a single data bit, that a radiofrequency oscillator is provided, that a data is provided to both inputs of which the output signal of the oscillator and said data signal is applied and from the output of which a radiofrequency signal, dated by the data signal, is taken and applied to the coil means.

BRIEF DESCRIPTION OF THE DRAWINGS

The invention will be explained further on the basis of an exemplary embodiment with reference to the drawings, in which:

FIG. 3 shows a circuit diagram of an alternative of the circuit according to FIG. 1;

FIG. 9 shows a graph for explaining the operation of the detection of the circuit of FIG. 1.

DETAILED DESCRIPTION OF THE INVENTION

Figure 1:
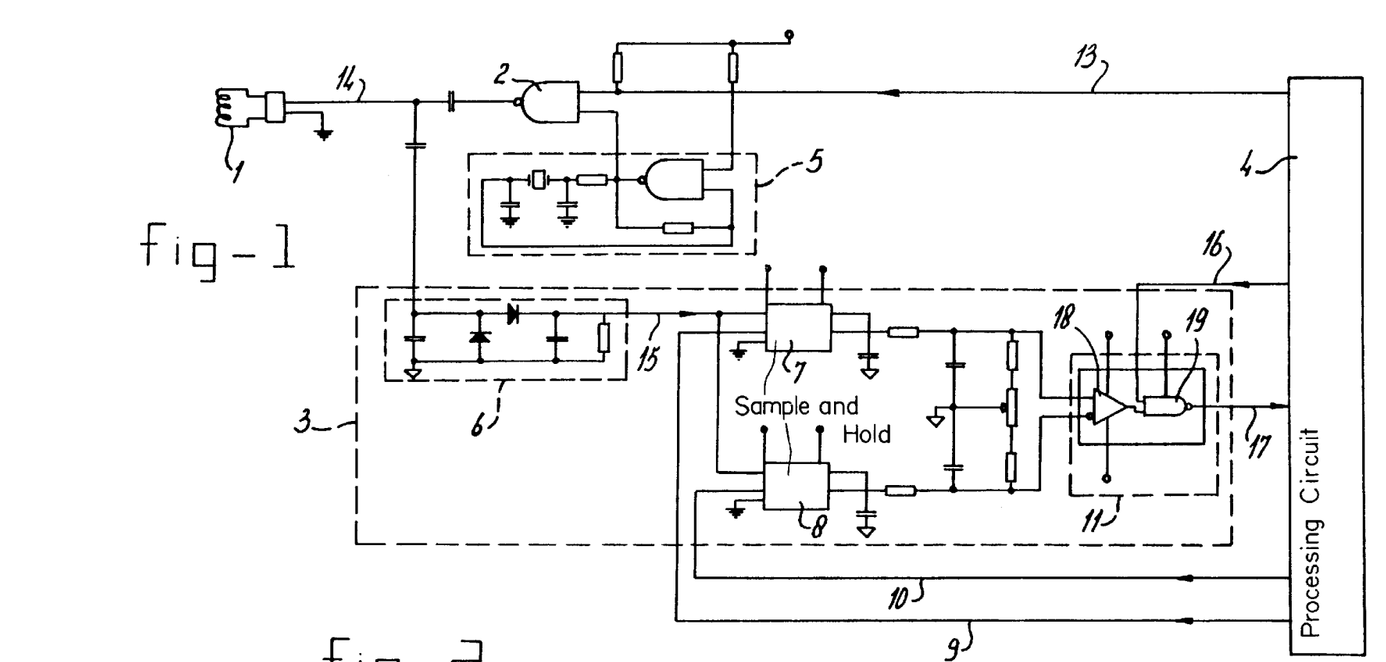
FIG. 1 shows a circuit diagram of an exemplary embodiment of the input/output circuit and processing circuit in a read/write unit of the system according to the invention.

The circuit of the read/write unit, shown in FIG. 1 as an example, comprises at its input a single coil 1 for bidirectional data transmission to and from the information carrier. A NAND gate 2 for the signal to be transmitted and a detector 3 for detection of incoming data are connected respectively to this coil. A data and sync signal, to be transmitted, is supplied by the processing circuit 4 via line 13 to one input of the NAND gate, in which signal together with the data the synchronization of the processing circuit 22 in the information carrier is comprised. A radiofrequency oscillator 5 is connected to the other input of said NAND gate, which oscillator will oscillate continuously during operation of the read/write unit. Its output signal, however, is interrupted in the gate 2 by said data and sync signal. Said oscillator 5 for example is a 5 MHz oscillator.

Figure 4:
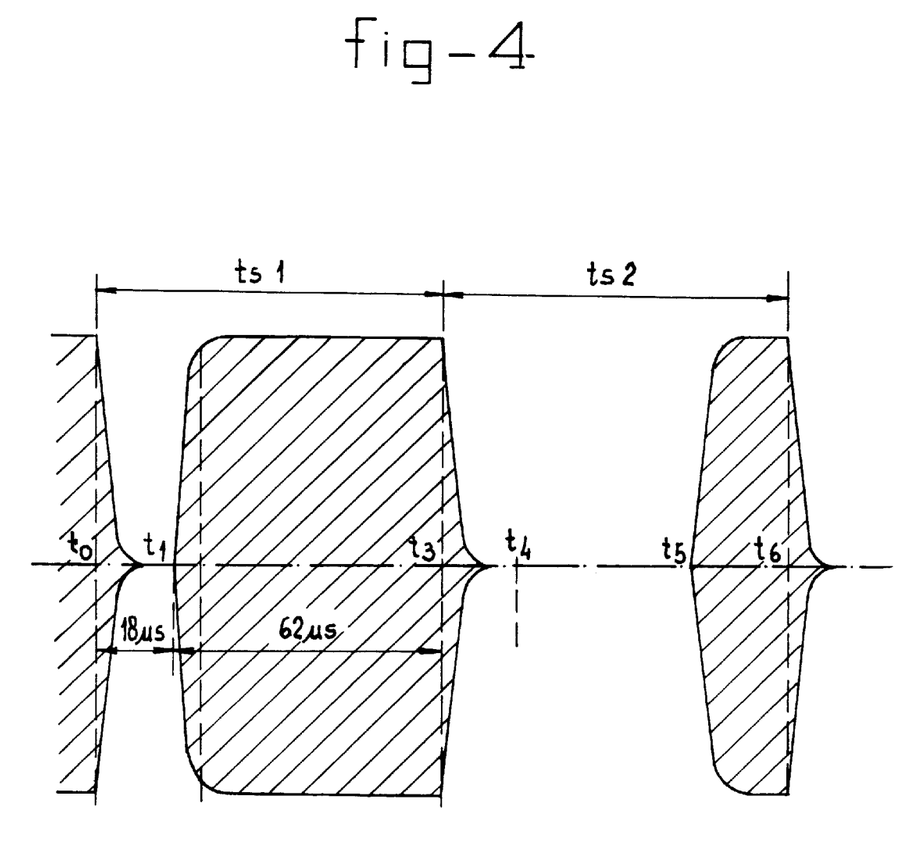
FIG. 4, 5a, 5b and 6 show a graph of the signal respectively in several points in the detector of the input/output circuit of the read/write unit according to FIGS. 1 and 3.

Therefore, the signal transmitted by the coil 1, driven by the gate 2, consists of a radiofrequency signal which is regularly divided in time slots ts1, ts2 and so on as shown in FIG. 4. The downward start flank or edge of each time slot hereby operates as synchronization signal. It is obvious that the radiofrequency signal, after the start edge, has to remain blanked for a short time in order to guarantee that the flank detector in the information carrier will detect the downward start edge. This signal inclusive of the sync edge can be denoted as sync pulse. In FIG. 4 as an example it is indicated that, in time slot ts1 from t0 till t3 of about 80 μsec., first the sync flank and subsequently from t1 till t3 of about 60 μsec. the radiofrequency signal as a one bit is supplied and that, in time slot ts2 from t3 till t6 of about 80 μsec., again the sync flank and subsequently from t5 till t6 of about 20 μsec. the radiofrequency signal as a zero bit is supplied, and so on. It is obvious that the radiofrequency signal towards the end of each time slot remains switched-in during a plurality of microseconds in order afterwards to cause said start edge of the following time slot to occur.

From the above, it follows that in each time slot only one single data bit (zero or one) is transmitted by interruption (time duration modulation) of the radiofrequency signal during different long intervals by control from the processing circuit 4.

Figure 2:
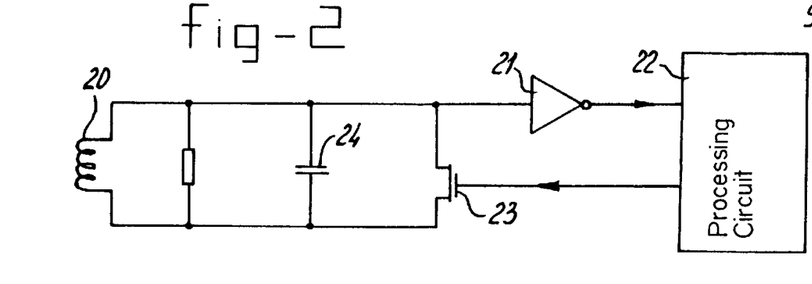
FIG. 2 shows a circuit diagram of an exemplary embodiment of the input/output circuit and processing circuit in the information carrier of the system according to the invention.

The input or receive circuit of the information carrier, shown in FIG. 2, comprises a single coil 20 for bidirectional data transmission to and from the read/write unit. An amplifier 21 is connected to this input gate to supply the incoming data signal to the processing circuit 22. Furthermore, a semiconductor switch 23 is connected to the input gate, which switch is driven by the processing circuit 22. Said switch in conducting state and in non-conducting state respectively constitutes a short-circuit for the coil 20 or does not constitute a short-circuit. When the information carrier is positioned within detection range of the read/write unit, the coil 20 together with the capacitor 24 will constitute a resonance circuit in case the switch 23 is non-conducting, which resonance circuit is tuned to the frequency of the radiofrequency field provided by the read/write unit. As a result of the inductive coupling between coils 1 and 20 in this case energy is absorbed from the field due to which the amplitude of the outgoing radiofrequency signal decreases.

In case the resonance circuit is short-circuited a detuning of this circuit occurs as a result of which energy is not absorbed from the field which effect will also be detected in the detector of the read/write unit.

After the information carrier once has arrived within said detection range, or in other words within write distance, the write signals transmitted by the reader can be received by the information carrier. These signals initially are the commands (or so called read commands) regularly provided by the reader, for activating the information carrier to supply signals to be read by the reader.

In case the processing circuit 22 by means of the read commands is synchronized by the sync edges of the incoming signal, data signals from the information carrier through the switching of the switch 23 can be transmitted only during the transmission of the radiofrequency signal of the oscillator 5 in the read/write unit. It is obvious that the actual latter transmission is dependent of the distance, so called read distance, within which the information carrier is positioned with respect to the reader. This read distance is dependent on the sensitivity of the detector in the reader.

Figure 5A:
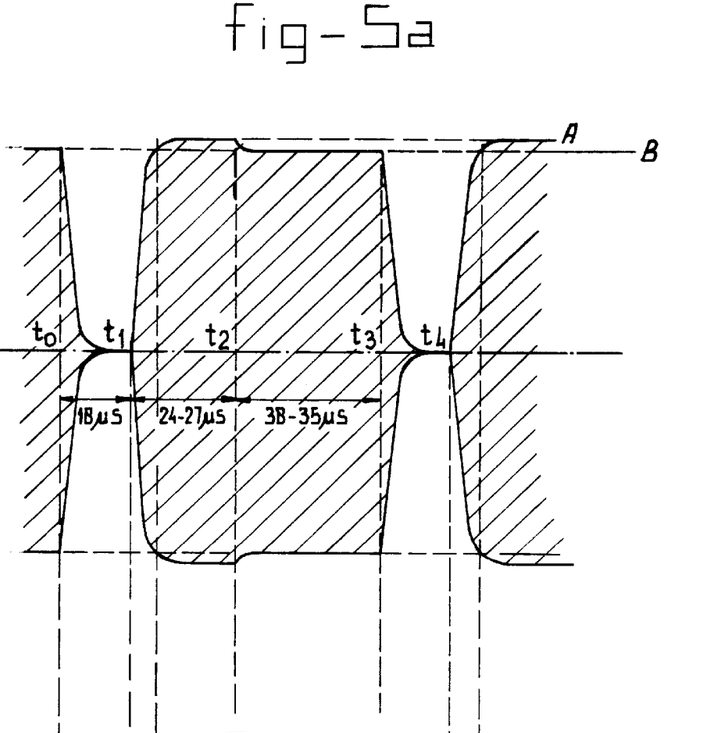

From the signal shown in FIG. 5a and present on line 14 at the input of detector 3, can be derived in which manner the detuning of the input circuit of the information carrier influences the amplitude of said signal. The input circuit in the information carrier is detuned in the period from t1 to t2 and the above signal has its normal maximum amplitude A. The input circuit is not detuned in the period from t2 to t3 and is in resonance, and the radiofrequency signal is attenuated and obtains a lower amplitude B. It is clear that the magnitude of this amplitude variation A-B in the figure is not drawn on scale and is only an example. When the information carrier is at a short or large reading distance with respect to the reader respectively, the amplitude variation will be larger or smaller respectively.

Figure 6:
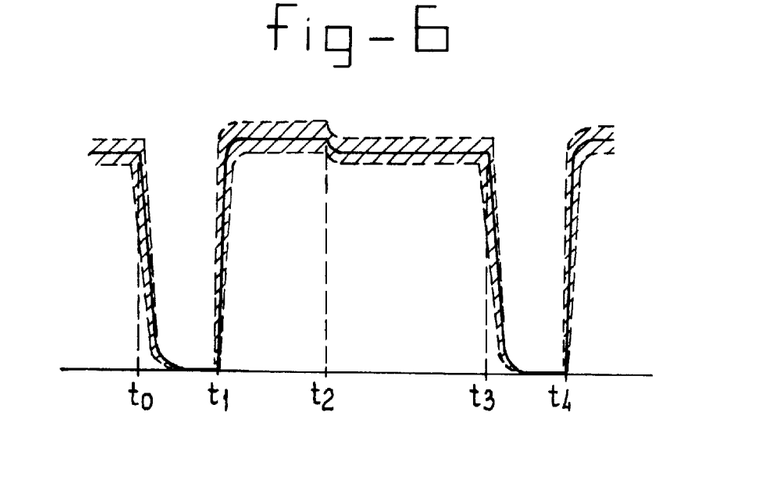

The detector 3 of FIG. 1 comprises at its input a double-phase rectifying circuit 6 for rectifying the 5 MHz component in the signal. In FIG. 6 the remaining 10 MHz ripple on the signal on line 15 is indicated having a value of 5% of the rectified DC voltage, which ripple can furthermore be reduced in the next circuit 7, 8.

Figure 5B:
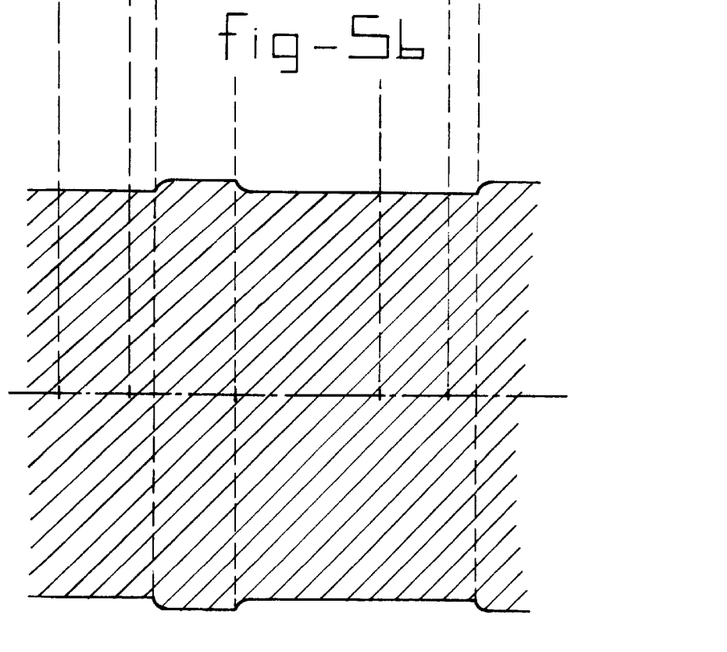

Following the rectifying circuit 6, a double sample-and-hold circuit 7, 8 is used in the detector 3 followed by an analog/digital converter 11. It is indicated in FIG. 5b that the zero signal following the sync edge between t0 and t1 is eliminated in the hold circuit by rectifying operation. The DC signal present in the circuits 7 and 8 is sampled with the aid of two sampling pulses supplied from the processing circuit 4 via the lines 9 and 10.

Figure 7:
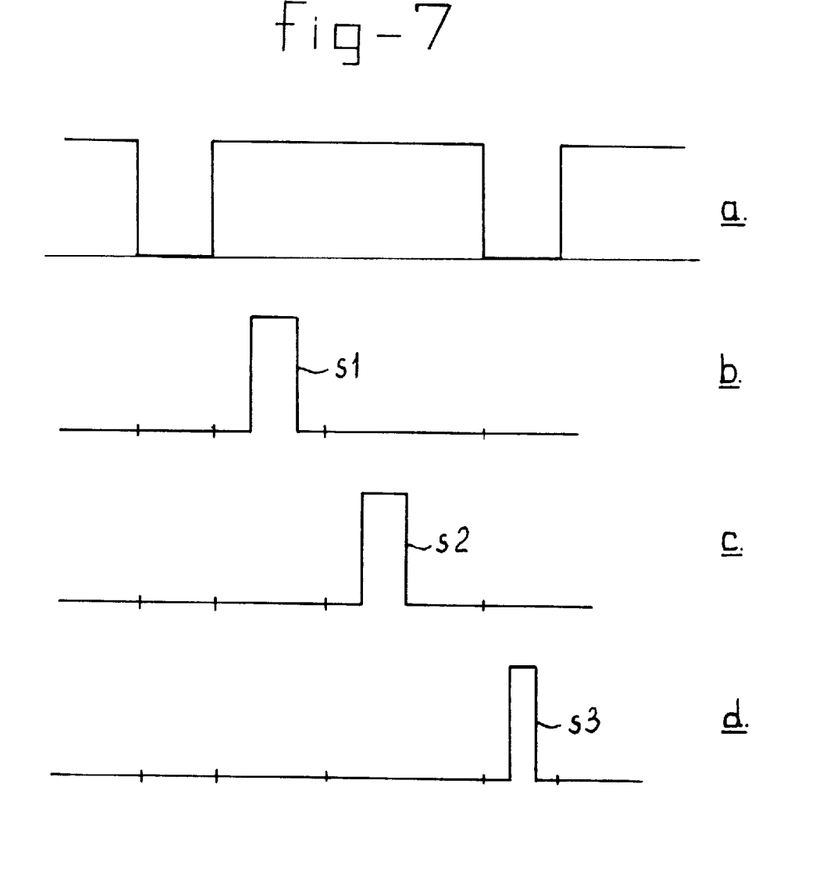
FIGS. 7a through 7d respectively show graphs of the signal at the input of the sample-and-hold circuit and of the associated sample pulses of the detector of FIG. 1.

These pulses are shown in FIGS. 7b and 7c occurring subsequently in time relative to the signal, roughly indicated in FIG. 7a, at the input of the sample and hold circuit 7, 8. The signal in circuit 7 is being sampled in the period between t1 and t2 with the sampling pulse s1 and the signal in circuit 8 is being sampled in the period between t2 and t3 with the sampling pulse s2. The output signals of both circuits 7 and 8 are supplied via a divider network to comparison circuit 11.

To the one input of the differential amplifier 18 in comparator 11 a direct voltage is supplied, which is obtained by sampling with s1 in circuit 7 and which corresponds with level A or with level B (see FIG. 5a) respectively upon detuning of non-detuning of the coil in the information carrier. To the other input of amplifier 18 a direct voltage is applied which is obtained by sampling with s2 in circuit 8 and which corresponds to level B which can be denoted a reference level. A differential signal is then obtained at the output of 18 which in any time slot can correspond either with (A-B)=Δ (for example a zero bit) or with A-B=0 (for example a one bit). This signal can be applied directly or via a NAND gate 19 to the processing circuit 4.

A separate sampling pulse s3, as indicated in FIG. 7d, is then supplied to gate 19 via line 16. This pulse s3 further increases the insensitivity for interference as this pulse specifically is supplied in the period between t0 and t1, in which there is no 10 MHz ripple. The signal ultimately from the circuit 11 on line 17 constitutes the data signal from the information carrier.

Figure 8:
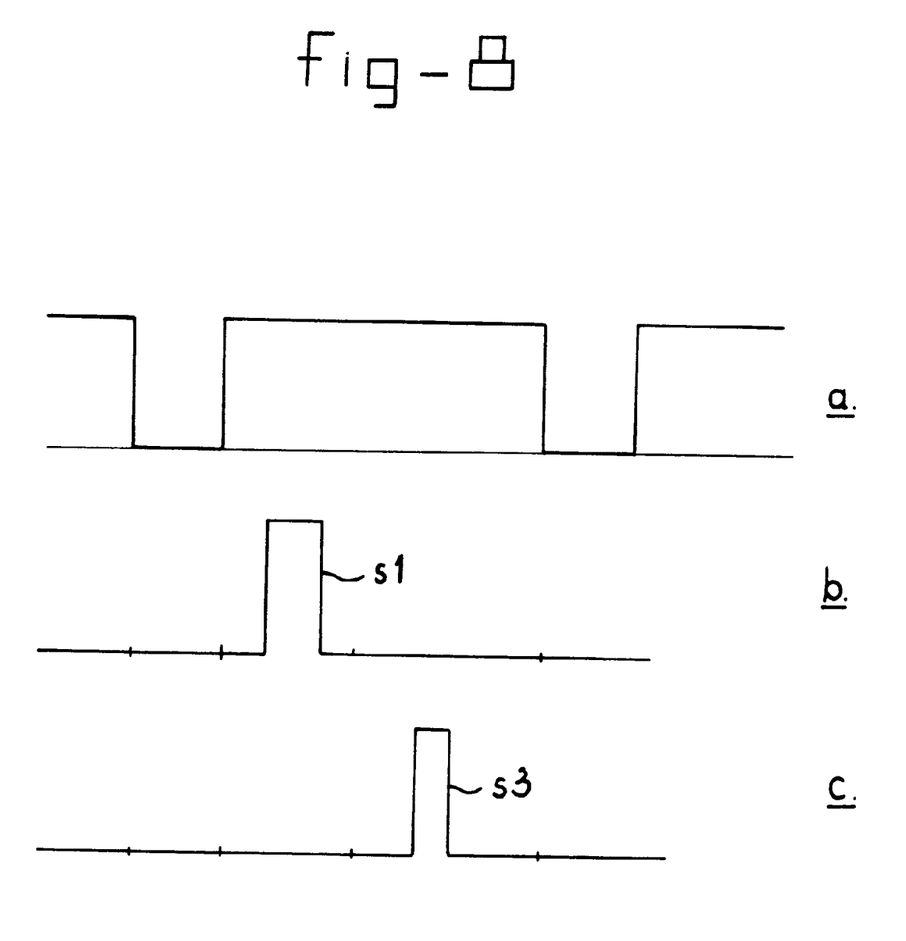
FIG. 8a through 8c respectively show graphs of the signal at the input of the sample-and-hold circuit and of the associated sample pulses of the detector of FIG. 3.

In FIG. 3 furthermore a variant is shown of the detector of FIG. 1. This detector comprises now a single sample and hold circuit 7, followed again by an adjustable resistance divider network and subsequently a comparator 11. The differential amplifier 18 in the comparator is again followed by a NAND gate 19. The sampling pulses s1 and s3 (see FIG. 8) are supplied to the circuit 7 and to the gate 19 respectively via lines 9 and 16.

The operation of this detector is reasonable but less precise than the one of FIG. 1. In contrast to the comparison of the first sampling (during s1 in FIG. 7b) with the sampling (during s2 in FIG. 7c) of the present signal, now the first sampling (during s1 in FIG. 8b) is compared with the sampled signal (during s3 in FIG. 8c). The precision with which both levels in comparator 11 of FIG. 3 are compared is less good than the comparison in FIG. 1. This, in the main, is due to the fact that the non-sampled signal, supplied via line 12, comprises ripple and because the signal has to develop from zero to 100%, through which the amplitude of the signal at the time of the comparison in 11 can not be guaranteed within 0.5%. The deterioration can mount to a factor of 10. That means when having two sample and hold circuits (s1, s2 in FIG. 1), a good detection, despite interference, can be guaranteed with an amplitude variation of 1%, and the variation when using one sample and hold (s1 in FIG. 3) can mount to 10%. The proportion R1, R2 in the adjustable resistance divider network can be selected with respect to the proportion R3, R4 such that with an amplitude proportion of 10% the comparator switches.

It has appeared in general with data transmission between reader and information carrier(s), that interfering moving or static elements in the field, whether or not of metal, will absorb varying quantities of energy from the field. As a result, the amplitude of the signal at the input of the detector will vary and be interfered with. It has appeared that these interferences mostly occur in a low frequency range of 0 to 200 Hz and can cause changes in amplitude of to 80%. However, the system is able to proceed in a reliable manner with the data transmission despite these strong interferences. The amplitude variations at the input are considerably reduced in the circuit according to the invention, e.g. an amplitude of 30% is diminished to a value of only 0.013% which has no further influence.

Relative to the excellent resistance to interference and sensitivity for the relevant signal, the following is explained with reference to the frequency diagram, indicated in FIG. 9, of the signals occurring in the system of FIG. 1.

In this diagram, signals are indicated having relative values with respect to the 100% amplitude of the 5 MHz signal. In the following explanation, further reference is made to the signal diagram of FIG. 5a. The sync pulse signal has a fundamental frequency of 27.8 kHz, that is $1/(2*18\ \mu s)$, having an amplitude of about 90% of the amplitude of the 5 MHz signal. The sync pulse repetition time has a fundamental frequency of 6.25 kHz, that $1/(2*80\ \mu s)$, having an amplitude of about 50% of the one of the 5 MHz signal. The signal to be detected has a base frequency between $1/(2*27\ \mu s)=18.5$ kHz and $1/(2*24\ \mu s)=20.8$ kHz having an amplitude smaller than 1% of the one of the 5 MHz signal.

Such as mentioned above, undesirable elements in the field will absorb varying quantities of energy from the field due to which the amplitude of the signal to be detected varies. One starts from a standard surrounding, in which the occurring interference brings about a variation of 30% in amplitude with frequencies between 0 to 200 Hz. The relevant signal, indicated near 20 kHz, will have to be detected amidst these interferences.

For this purpose the detection method and detector according to the invention is advantageously used. First, the interfering components of 27.8 kHz and 6.25 kHz have to be removed. For this purpose, a rectifying operation is brought about through which the signal, as indicated in FIG. 5a, is disposed of the zero periods and obtains the shape, indicated in FIG. 5b, after the rectifying operation. Thereby the amplitude of the 27 kHz signal is reduced to zero and also the 6.25 kHz signal, caused by the repetition time, is eliminated.

The radiofrequency signal is rectified by means of the doublephase rectifying in the rectifier 6, through which operation a 10 MHz ripple (see FIG. 6) remains. This ripple is furthermore reduced to 5% of the rectified DC voltage through the subsequent simple RC network.

Such as is explained above, the amplitude levels A and B in the analog signal (FIGS. 5a and 5b) can vary with 30% at frequencies between 0 and 200 Hz. In order to obviate this furthermore (see FIG. 7), signal samples are taken by means of the sampling pulses s1 and s2 and a comparison sampling pulse s3. This last sampling takes place in the zero interval directly following t0, during which the 10 MHz ripple is not present. For the rest, the 10 MHz ripple is further reduced in the sampling circuits.

By placing the sampling pulses s1 and s2 as close as possible together in above mentioned sampling, one reduces the sensitivity for undesirable voltage variations.

In the following example, an intersampling time of 20 μsec. is used. That means, the pulses s1 and s2 are positioned 20 μsec. from each other. The sampled amplitude of the relevant signal is denoted as As, and an undesired sinuslike interference signal of 200 Hz is superposed. We start for example with the requirement that the voltage change Δe resulting from this undesirable signal has to be smaller than 1% of As. The amplitude of the undesired signal is set on 40% of As. Then:

$$\Delta e=0.4*As*\sin\ \omega(t0+\Delta t)$$

The most unfavourable situation is when t0=0, because with a sinuslike signal the change at t0=0 is largest. The it follows that $$\Delta e=0.4As*\sin\ 2*\pi*200*20*10^{-6}=0.01\ As$$

Thereby a reduction of interference has taken place from 0.4 to 0.01, that means with a factor 40.

In this embodiment of the detector apart from the above resistance against interferences also an excellent sensitivity for detection of the relevant signal is obtained.

Figure 10A:
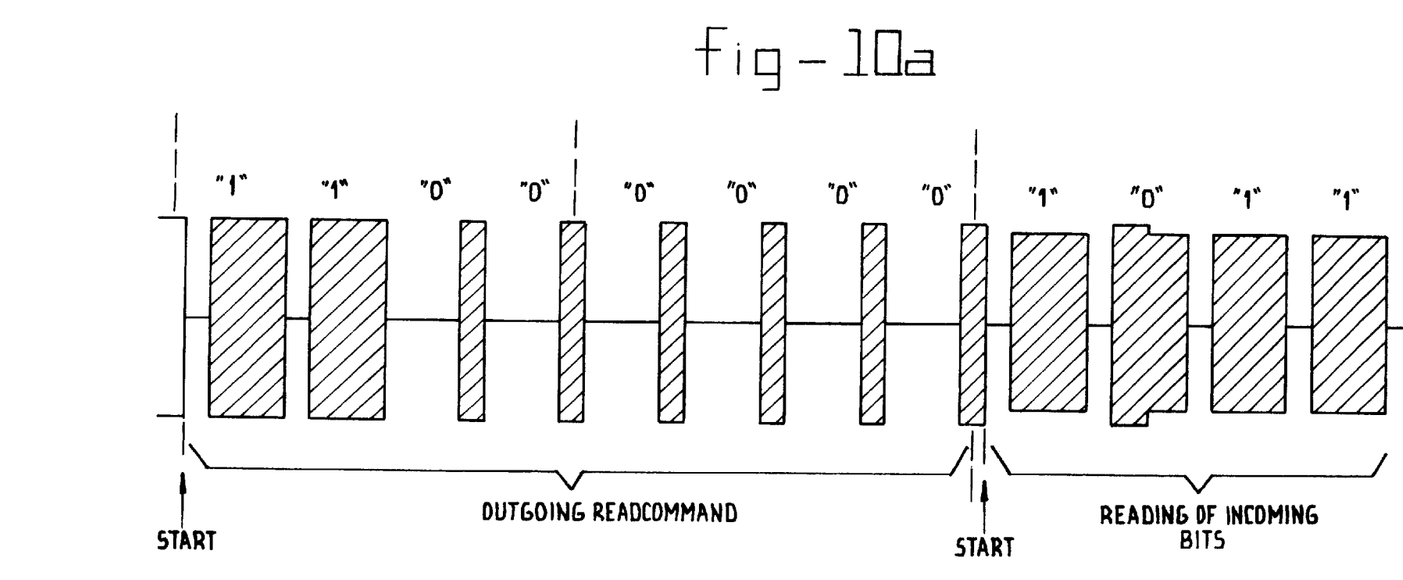
FIG. 10a and 10b show an example of a read/write protocol occurring in the read/write unit at the start of the exchange of information.

In FIG. 10a an example is given of the read and write commands at the start of an exchange of information between read/write unit and one or more information carriers, i.e. by means of the radiofrequency signal emitted by the coil 1 of the read/write unit. At the beginning of this algorithm, the read/write unit transmits a sequence of eight bits, i.e. two ones and six zeros, as a read command for information carriers possibly present within write distance, e.g. the detection range. The radiofrequency signal interrupted by sync pulses is transmitted during the transmission of the ones entirely and is partly not transmitted during the transmission of the zeros.

Figure 10B:
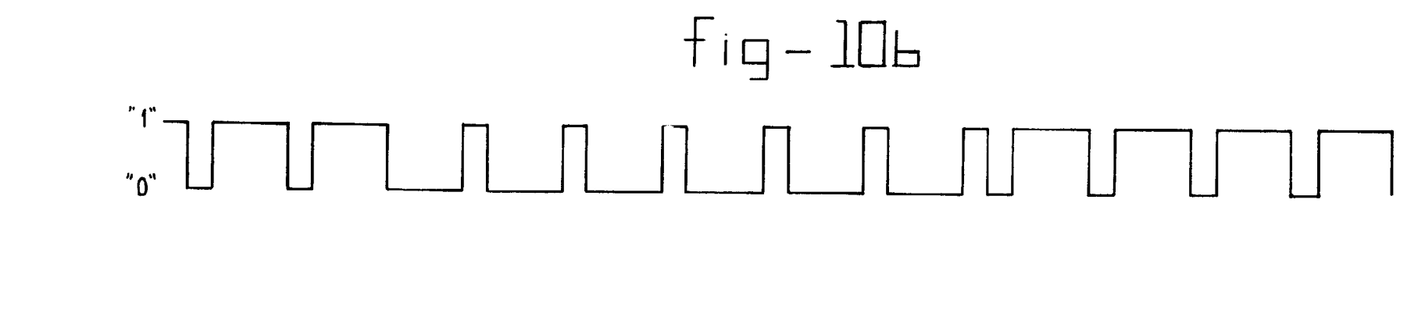

The data signal corresponding with FIG. 10a and supplied by the processing circuit 4 to the gate 2 is indicated in FIG. 10b. Therefrom it appears that in each time slot the suppression interval (of about 20 µsec.) preceded by a sync edge, is followed by a one bit (of about 40 µsec.) or a zero bit (no signal). This one bit or zero bit is followed, within each timeslot, by a radiofrequency signal of about 20 µsec. The latter is required because the trailing edge thereof represents the start of the sync pulse for the synchronization of the information carrier.

During the response cycle of the information carrier, (see FIG. 10a) the radiofrequency oscillator of the read/write unit continuously transmits radiofrequency signals. During the first slot, the input circuit of the information carrier is in resonance and the signal therefore at the input of the detector is attenuated, which represents a "1" bit. During the second slot, the input circuit of the information carrier is detuned by its processing circuit, through which a "0" bit is received, etc, in the reader.

In case following the read command, when the read/write unit is reading the four succeeding bits, one or more bits are equal to "0", then there is an information carrier in the field and the following bits after this are read. In case there is no "0", the cycle is repeated.

The above indicated embodiment according to the invention makes it possible to realize data transmission with high reliability between read/write unit and information carrier, such as a chip card or chip pen, up to a range of 70 to 80 cm. The detector in the read/write unit is able to detect amplitude variation, i.e. a level difference between the levels A and B in FIG. 3, of 1%.

When using mobile, non-fixed data carriers it is an absolute requirement that a started write operation to the data carrier is errorfree completed. For, after the data carrier is gone from the operational range of the read/write unit, there is no correction possible anymore. A data transmission, which is not correctly completed, mostly will result in that the data carrier cannot be identified anymore. Correction by means of a subsequent presentation of the carrier then is also impossible. To this end it is required that, in case the data carrier leaves the location where writing started with the maximum possible acceleration, said data carrier is still within the write range of the read/write unit at the moment that the data transmission is completed.

With above mentioned embodiment according to the invention, the input/output circuits of the reader and of the information carrier are implemented such that a read distance, adjustable by selection of components, is obtained which is smaller than the write distance. Preferably the circuit is implemented such that a write distance is obtained which is about two times the read distance. In other words, a moving information carrier, coming into the write distance of the system, will receive the read command regularly provided by the reader and will directly be activated by the same. This write distance can be affected in substance by adjusting the transmission power of the reader. Upon further movement generally in the direction of the reader, the signal provided by the information carrier at a certain moment will be read or detected by the reader. The associated read distance is smaller than said write distance and is determined in substance by the sensitivity of the detector in the reader.

The conditions for errorfree writing are obtained by starting the relevant data exchange at a moment, whereupon the data carrier is guaranteed within the read distance. In dependence on the application, the difference between write distance and read distance is adjusted such that the data carrier has never left the write distance before the data transmission is completed.

It is obvious that variants and modifications to above indicated examples are possible within the scope of the invention. For example, other pulse durations in the data and sync signal and other frequencies can be applied.

We claim:

1. A system for contactless exchange of information by wireless radiofrequency signal transmission between a read/write unit and an information carrier, comprising:

a read/write unit comprising a first input/output circuit, an associated first coil means, and a first processing circuit;

said first input/output circuit comprising a radiofrequency oscillator, a first gate with inputs for an output of said radiofrequency oscillator and a data signal, said first gate being gated by the data signal;

said first coil means being operatively connected to an output of said first gate for taking a radiofrequency signal;

an information carrier comprising a second input/output circuit, an associated second coil means, and a second processing circuit;

said first and second coil means being inductively coupled to each other for bidirectional data transmission when the information carrier is positioned within transmission range of the read/write unit;

said information carrier second coil means, responsive to a transmission of the radiofrequency signal by the read/write unit, being variably tuned, solely during said radiofrequency signal being transmitted, for a data signal transmission, and said first processing means dividing the data signal transmission into time slots, each of which comprises a trailing edge sync pulse and a single data bit which is a one bit or a zero bit, wherein said first input/output circuit of said read/write unit further comprises
a rectification circuit for rectifying an input signal;
a detector having two sample and hold circuits, connected in parallel, said detector being operatively connected to said rectification circuit for receiving and applying the rectified input signal in parallel to said sample and hold circuits, and operatively connected to receive first and second sampling pulses, from said first processing circuit, for sampling successively in time the input signal; and
an analog-to-digital converter operatively connected to receive output signals of said two sample and hold circuits.

2. A system for contactless exchange of information by wireless radiofrequency signal transmission between a read/write unit and an information carrier, comprising:

a read/write unit comprising a first input/output circuit, an associated first coil means, and a first processing circuit;

said first input/output circuit comprising a radiofrequency oscillator, a first gate with inputs for an output of said radiofrequency oscillator and a data signal, said first gate being gated by the data signal;

said first coil means being operatively connected to an output of said first gate for taking a radiofrequency signal;

an information carrier comprising a second input/output circuit, an associated second coil means, and a second processing circuit;

said first and second coil means being inductively coupled to each other for bidirectional data transmission when the information carrier is positioned within transmission range of the read/write unit;

said information carrier second coil means, responsive to a transmission of the radiofrequency signal by the read/write unit, being variably tuned, solely during said radiofrequency signal being transmitted, for a data signal transmission, and said first processing means dividing the data signal transmission into time slots, each of which comprises a trailing edge sync pulse and a single data bit which is a one bit or a zero bit, wherein said first input/output circuit of said read/write unit further comprises
  a rectification circuit for rectifying an input signal;
  a detector having two sample and hold circuits, connected in parallel, said detector being operatively connected to said rectification circuit for receiving and applying the rectified input signal in parallel to said sample and hold circuits, and operatively connected to receive first and second sampling pulses, from said first processing circuit, for sampling successively in time the input signal; and
  an analog-to-digital converter operatively connected to receive output signals of said two sample and hold circuits, and wherein said first and second sampling pulses have an intersampling time of approximately 20 microseconds.

3. A system for contactless exchange of information by wireless radiofrequency signal transmission between a read/write unit and an information carrier, comprising:

a read/write unit comprising a first input/output circuit, an associated first coil means, and a first processing circuit;

said first input/output circuit comprising a radiofrequency oscillator, a first gate with inputs for an output of said radiofrequency oscillator and a data signal, said first gate being gated by the data signal;

said first coil means being operatively connected to an output of said first gate for taking a radiofrequency signal;

an information carrier comprising a second input/output circuit, an associated second coil means, and a second processing circuit;

said first and second coil means being inductively coupled to each other for bidirectional data transmission when the information carrier is positioned within transmission range of the read/write unit;

said information carrier second coil means, responsive to a transmission of the radiofrequency signal by the read/write unit, being variably tuned, solely during said radiofrequency signal being transmitted, for a data signal transmission, and said first processing means dividing the data signal transmission into time slots, each of which comprises a trailing edge sync pulse and a single data bit which is a one bit or a zero bit, wherein said first input/output circuit of the read/write unit further comprises
  a rectification circuit for rectifying an input signal;
  a detector having a single sample and hold circuit, said detector being operatively connected to said rectification circuit for receiving and applying the rectified input signal to said single sample and hold circuit, and operatively connected to receive a sampling pulse, from said first processing circuit, for sampling successively in time the input signal; and
  an analog-to-digital converter operatively connected to receive an output signal of said single sample and hold circuit;

and wherein said analog-to-digital converter comprises an input differential amplifier and a second gate, said second gate comprising a first input connected to an output of said input differential amplifier and a second input operatively connected to said first processing circuit for receiving a converter sampling pulse.

* * * * *